Feb. 17, 1931.  E. B. CARNS  1,793,056
FOLDING WING
Filed Aug. 1, 1929  2 Sheets-Sheet 1
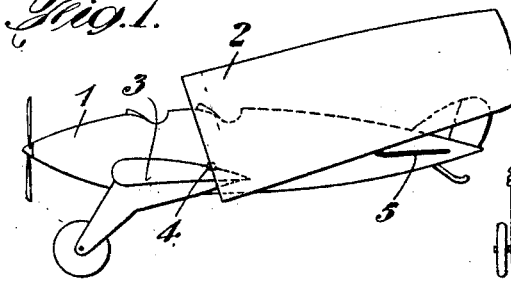
Fig. 1.
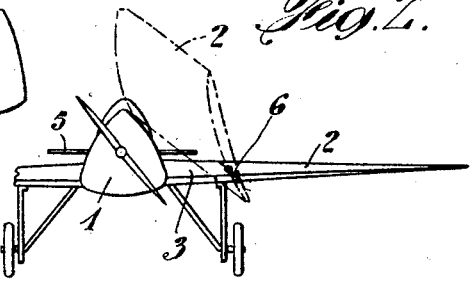
Fig. 2.
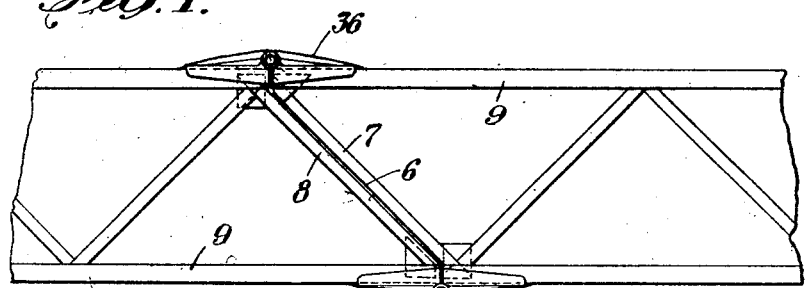
Fig. 4.
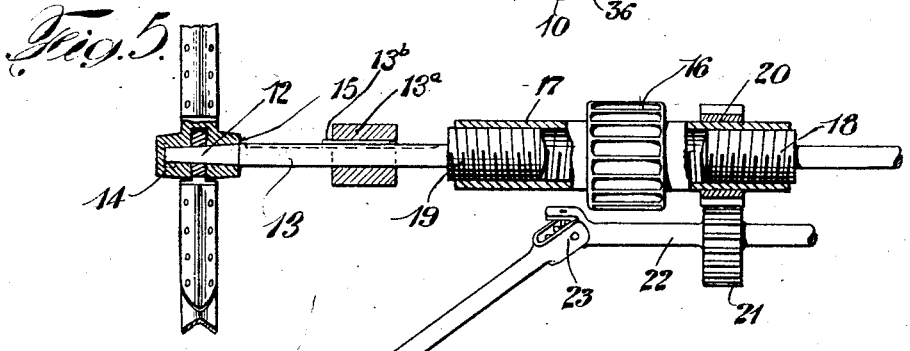
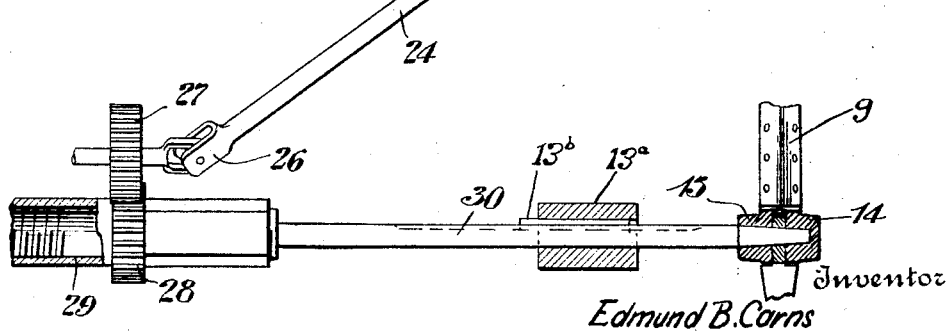
Fig. 5.
Inventor
Edmund B. Carns
By his Attorneys

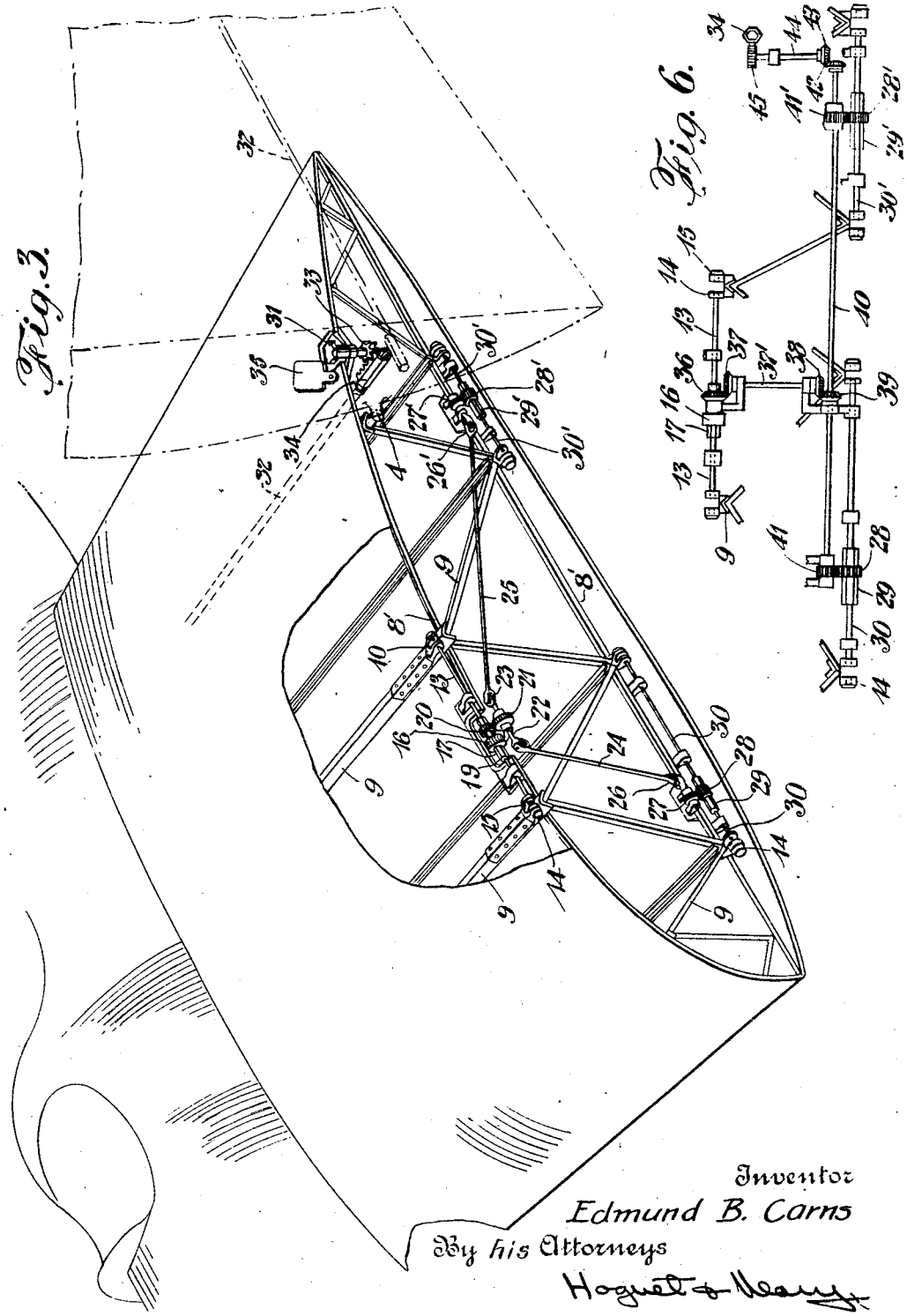

Patented Feb. 17, 1931

1,793,056

UNITED STATES PATENT OFFICE

EDMUND B. CARNS, OF NAUGATUCK, CONNECTICUT, ASSIGNOR TO CAIRNS DEVELOPMENT COMPANY, OF WILMINGTON, DELAWARE, A CORPORATION OF DELAWARE

FOLDING WING

Application filed August 1, 1929. Serial No. 382,618.

My invention relates to improvements in aircraft and more particularly to folding wings for aircraft.

Due to the changing conditions and the greater number in use it has become essential that airplanes be stored and moved about on the ground with the same ease as that of automobiles. This is especially true in large flying fields where a large amount of hangar space is required for storage of the aircraft. By using folded wings on aircraft it is possible to greatly decrease the amount of storage space required, and to make easy their movement on highways and through other comparatively narrow spaces.

One of the primary objects of my invention is to obtain a safe, strong, yet easily operated structure which permits the wings of an airplane to be folded back. Another object is to achieve a folded wing structure which may be easily operated by one person without the necessity of special tools, and which may be operated from a central point.

Other objects and advantages of my invention will appear from the following description and drawings, in which, Figure 1 represents a diagrammatic side elevation of a plane with a wing in folded position;

Figure 2 represents a front elevation of Figure 1 with the wing in horizontal position;

Figure 3 represents a partially broken, perspective view of my folding wing apparatus;

Figure 4 represents a longitudinal section of the wing showing the joint;

Figure 5 represents a detail of a portion of the fastening apparatus, and

Figure 6 represents a modified form of my fastening apparatus.

Referring more particularly to the drawings in which like reference characters denote like parts, 1 of Figure 1 designates a fuselage of an airplane which has one of its wings 2 folded back. The stub 3 of the wing remains permanently fixed to the fuselage. The wing 2 when in the folded position remains connected to the stub 3 by means of the ball and socket joint 4 and may be rested on the elevator 5 when in the folded position.

I have shown my device in connection with a preferred form of wing structure disclosed in my copending application Serial No. 370,695 filed June 13, 1929. It is of course adaptable to other types of structures. With my preferred type of construction which I have used to illustrate my invention I cut the wing section on a diagonal and parallel to the interbracing as shown at 6 of Figure 4, and close the ends of the sections 2 and 3 at the joint by means of the struts 7 and 8 which connect the upper and lower spars. I also have each of the upper and lower abutting ends of the wings closed by means of ribs 8' connected to the ends of the spars 9, Fig. 3. In this manner I leave no unsupported structural elements and have not weakened my wing structure.

On each of the upper and lower spars 9 I place the eyelets 10 which are fastened to the outer surface of the spars by means of their gussets which are riveted to the sides of the spars. On the spars in the stub 3 the eyelets are in pairs as shown at 14 and 15, Figure 5. The eyelets fastened to the ends of the spars in the folding wing section are single and adapted to pass between the pairs of eyelets on the stub section as shown at 11, Figure 5. These eyelets are held rigidly together by means of the rods 13 which have tapered ends 12 adapted to slide in the eyelets. The eyelets on the stub section each have the abutments 14 and 15. The abutments 14 give added strength and make a firmer joint. The abutment 15 serves to hold the end of the rod 13 when it has been drawn out to such a position that the eyelet 11 may be withdrawn. The holes of the eyelets may be combined to form a tapering recess and the ends 12 of the rods 13 formed to fit the taper. With this arrangement the rod when in place would give a strong rigid connection and one which could be easily withdrawn.

I have arranged the rods 13 in such a manner that they may all be withdrawn from the eyelets by one operation thus eliminating considerable labor in disconnecting the wing. I have placed the hand wheel 16 in the upper portion of the wing. This hand wheel is connected to an internally threaded socket 17 which is open at both ends. The heads 18 and 19 of the upper rods 13 are threaded and screw in this socket. By turning the hand wheel 16 the rods 13 are slid out from their respective eyelets by the heads 18 and 19 screwing into the socket 17. A bearing 13a cooperates with the key 13b on shaft 13 to retain the shaft in alignment and prevent it from turning. It is necessary of course to have one of the heads 18 threaded with a left hand thread and the opposite head 19 with a right hand thread.

In order to disjoint the eyelets on the lower spars with the same operation I have fitted the socket 17 with a gear 20 which meshes with a gear 21 turning a rod 22. This rod is fitted at each end with a universal joint 23 as can be seen in Figures 3 and 5. These universal joints operate the rods 24 and 25, one of which goes to the forward part of the wing and the other to the rear of the wing. At the lower end of each of these rods there are universal joints 26 and 26' respectively, which operate the gears 27 and 27' which mesh with gears 28 and 28' on sockets 29 and 29', similar to socket 17. These sockets are threaded to the heads of the rods 30 and 30' and when the sockets are turned the rods are given a longitudinal movement. These rods 30 and 30' operate in the eyelets in a manner similar to that of the rods 13 as described above.

I have shown at 31 of Figure 3, a method for disconnecting the aileron control 32 in the wing. This apparatus consists of a thumb screw 31 which operates a gear 33. This gear meshes with a rack on a sleeve 34. The sleeve is hexagonal in shape and fits over the abutting ends of the aileron rods 32 giving a rigid connection. By turning the thumb screw 31 it is possible therefore, to move the hexagonal sleeve back from the hexagonal end of the aileron control in the folding section of the wing, thus permitting the wing to be folded back.

The opening necessary to operate the thumb screw 31 may be closed by means of the pivoted or sliding cover 35. The eyelets holding the folding wing and stub together may be stream lined as shown in 36. The mechanism for fastening and disjointing the wing may be placed inside the cover of the wing, thus eliminating the necessity for stream lining. The opening necessary for the operation of the hand wheel 16 may be closed in a manner similar to that described in connection with the thumb screw 31.

The operation of my device consists in opening the cover 35 over the aileron sleeve 34. The hand wheel 31 is then turned which retracts the sleeve and breaks the joint between the aileron control rods 32. The cover over the hand wheel 16 is then opened and the hand wheel turned so as to screw the heads 18 and 19 of the rods into the socket and thus move the rods in the eyelets 14 and 15 to such a position that the eyelet 11 may be withdrawn. This same operation thru the gears 20 and 21 turns the rod 22 which operates at one end the rod 24 and the gears 26 and 28 which turn the socket 29. The rods 30 are thus withdrawn from the lower eyelets and are retracted into the socket 29. The rear eyelets are disconnected at the same time by means of the turning force transmitted to the socket 29' by the rods 22 and 25. After the eyelets have all been disconnected, the wing still remains in position due to the diagonal joint between the stub and wing section and the ball and socket joint 4 in the upper portion of the wing. The tip of the wing is then lifted, turned to a vertical position, and carried rearwardly so that it is parallel to the fuselage. The wing may be rested upon the elevator 5. The operation for disconnecting the other wing would, of course, be similar.

I have shown at Figure 6 a modified form of my folding wing fastening structure. This modification consists primarily in changes in the central control system for fastening and unfastening the various connecting eyelets. The eyelets 14 and 15 are similar to those in Figure 3. The socket 17 has the usual hand wheel 16 placed upon it. However, in place of the gear 20 there is a beveled gear 36 which operates with another beveled gear 37 on the vertical rod 37'. At the lower end of this rod there is another gear 38 which meshes with the beveled gear 39 on a rod 40 extending transversely across the lower part of the wing. The rod 40 carries the gears 41 and 41' which mesh with the gears 28 and 28' similar to those shown in Figure 3. The rod 40 has at its extreme end a beveled gear 42 which meshes with another gear 43. This gear is connected by a short vertical rod 44 with a gear 45 which meshes with the rack of the sleeve 34 on the aileron control rods. It can thus be seen that by turning the hand wheel 16 the rods 13 will be withdrawn from the eyelets 14 and 15. At the same operation the rod 37' will be turned which will turn the rod 40. The rod 40 will operate the sockets 29 and 29' withdrawing the rods 30 and 30' from the lower eyelets. This same operation will also, through the gears 42, 43 and 45, retract the sleeve 34 from the aileron control 32.

It will be seen therefore that I have achieved a simple mechanism for disjointing a wing so that it may be folded back to such a position that a great saving in space is obtained. The operation may be accomplished easily by one person without the use of any tools. At the same time the connecting structure is such that there is no diminution of the strength of the wing structure.

It is obvious of course that there may be many modifications of this device without departing from the spirit of the invention.

I therefore do not wish to be limited by this specific embodiment herein illustrated and described, but only by the scope of the appended claims and the prior art.

I claim:

1. In an aircraft having folding wings, connecting means at the inner ends of a plurality of spars of each wing, and a single control means within the wings for actuating said connecting means.

2. In an aircraft having folding wings, connecting means at the inner ends of a plurality of spars of each wing, and a single control means within the wings for connecting and disconnecting said spar ends.

3. In an aircraft having folding wings, eyelets fastened to a plurality of spars in the wing stub and in the folding wing section, pins adapted to connect the eyelets in the stub section to the folding wing section, and a control means within the wings actuating said pins to engage and disengage the eyelets.

4. In an aircraft having folding wings, socket connections between a plurality of corresponding spars in a wing stub and a folding wing section, and a control means within the wings for connecting and disconnecting said socket connections.

5. In an aircraft having folding wings, socket connections between a plurality of corresponding spars in a wing stub and a folding wing section, pins for fastening said socket connections, and a control means within the wings operating said pins for fastening and unfastening said socket connections.

6. In an aircraft having folding wings, ailerons and aileron controls, connecting means at the inner ends of a plurality of spars of each wing, and a control means for actuating said connecting means and for connecting and disconnecting said aileron control.

7. In an aircraft having folding wings, ailerons and aileron controls, fastening means at the inner ends of a plurality of spars of each wing, elements connecting the fastening means on the corresponding spars, and a control means for operating said elements and simultaneously engaging and disengaging said aileron control.

8. An airplane having a fuselage, wing stubs fastened to said fuselage, a wing section adapted to fit on each of said wing stubs, a swinging connection between said stub section and said wing section, connecting means on a plurality of spars of said stub section and said wing section, and a control means engaging and disengaging a plurality of said connecting means.

9. An airplane having a fuselage, wing stubs fastened to said fuselage, a wing section adapted to fit on each of said wing stubs, an aileron in said wing section, an aileron control between said aileron and said fuselage, a swinging connection between said stub section and said wing section, connecting means on a plurality of spars of said stub section and said wing section, and a control means engaging and disengaging said connecting means and said aileron control simultaneously.

10. An airplane having wing stubs, a wing section adapted to fit on each of said wing stubs, a swinging connection between said stub section and said wing section, a plurality of connecting means between said stub and wing sections, and a control means within said wing whereby a plurality of said connecting means may be engaged and disengaged.

In testimony whereof, I have signed my name to this specification this 29th day of July, 1929.

EDMUND B. CARNS.